US012764752B2

(12) United States Patent
Fu et al.

(10) Patent No.: US 12,764,752 B2
(45) Date of Patent: Oct. 13, 2026

(54) MONITORING METHOD AND DEVICE, AND READABLE STORAGE MEDIUM

(71) Applicant: Beijing Xiaomi Mobile Software Co., Ltd., Beijing (CN)

(72) Inventors: Ting Fu, Beijing (CN); Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 231 days.

(21) Appl. No.: 18/726,487

(22) PCT Filed: Jan. 7, 2022

(86) PCT No.: PCT/CN2022/070852
§ 371 (c)(1),
(2) Date: Jul. 3, 2024

(87) PCT Pub. No.: WO2023/130396
PCT Pub. Date: Jul. 13, 2023

(65) Prior Publication Data
US 2025/0081203 A1 Mar. 6, 2025

(51) Int. Cl.
*H04W 72/23* (2023.01)
*H04L 43/08* (2022.01)

(52) U.S. Cl.
CPC ............. *H04W 72/23* (2023.01); *H04L 43/08* (2013.01)

(58) Field of Classification Search
CPC ............................... H04W 72/23; H04L 43/08
See application file for complete search history.

(56) References Cited

U.S. PATENT DOCUMENTS

2020/0396701 A1* 12/2020 Yi ........................ H04W 72/569
2025/0008431 A1* 1/2025 Lai ........................... H04L 5/001

FOREIGN PATENT DOCUMENTS

| | | | |
|---|---|---|---|
| CN | 113300789 | A | 8/2021 |
| CN | 113412649 | A | 9/2021 |
| CN | 113453322 | A | 9/2021 |
| CN | 113543287 | A | 10/2021 |
| WO | 2020248143 | A1 | 12/2020 |
| WO | 2021/253412 | A1 | 12/2021 |
| WO | 2021/253431 | A1 | 12/2021 |

OTHER PUBLICATIONS

Ericsson,"Design of active time power savings mechanisms",3GPP TSG RAN WG1 #106-e, Tdoc R1-2110139,Oc. 11-Oct. 19, 2021.
ITRI,"Discussion on DCI-based power saving adaptation",3GPP TSG RAN WG1 #105-e,R1-2105758, May 10-Apr. 27, 2021.

* cited by examiner

*Primary Examiner* — Ronald B Abelson
(74) *Attorney, Agent, or Firm* — Volpe Koenig

(57) ABSTRACT

A method, apparatus and computer readable medium for monitoring a physical downlink control channel (PDCCH) in a user equipment. The monitoring is performed by: receiving a physical downlink control channel (PDCCH) monitoring adaptation indication on a first serving cell; and determining that the user equipment performs PDCCH monitoring in the first serving cell according to the PDCCH monitoring adaptation indication.

16 Claims, 7 Drawing Sheets

MONITORING METHOD AND DEVICE, AND READABLE STORAGE MEDIUM

CROSS-REFERENCE TO RELATED APPLICATIONS

The present application is a U.S. National Stage of International Application No. PCT/CN2022/070852, filed on Jan. 7, 2022, the contents of all of which are incorporated herein by reference in their entirety for all purposes.

BACKGROUND OF THE INVENTION

User equipment (UE) may use a physical downlink control channel (PDCCH) monitoring adaptation mechanism in case of monitoring a PDCCH.

SUMMARY OF THE INVENTION

The present disclosure relates to the technical field of wireless communications, and in particular to a monitoring method, a monitoring device, and a readable storage medium.

A monitoring method, a monitoring device, and a readable storage medium are provided according to the present disclosure.

In a first aspect, a monitoring method is provided. The monitoring method is performed by a user equipment, which includes: receiving a physical downlink control channel (PDCCH) monitoring adaptation indication on a first serving cell; and determining that the user equipment performs PDCCH monitoring in the first serving cell according to the PDCCH monitoring adaptation indication.

In a second aspect, a monitoring method is provided. The method is performed by a network device, which includes: sending, on a first serving cell, a physical downlink control channel (PDCCH) monitoring adaptation indication to a user equipment, where the PDCCH monitoring adaptation indication is configured to indicate to the user equipment to determine to perform PDCCH monitoring in the first serving cell according to the PDCCH monitoring adaptation indication.

In a third aspect, a communication device is provided. The communication device includes one or more processors and a memory that stores a computer program; and the computer program when executed by the one or more processors cause the communication device to: receive a physical downlink control channel (PDCCH) monitoring adaptation indication on a first serving cell; and determine that the user equipment performs PDCCH monitoring in the first serving cell according to the PDCCH monitoring adaptation indication.

In a fourth aspect, a communication device is provided. The communication device includes one or more processors and a memory that stores a computer program; and the computer program, when executed by the one or more processors, causes the communication device to execute the second aspect or any of the possible designs of the second aspect.

In a fifth aspect, a non-transitory computer-readable storage medium is provided. The non-transitory computer-readable storage medium stores instructions (or a computer program, a program) thereon. The instructions, when invoked by a processor of a communication device, cause the communication device to execute the first aspect or any of the possible designs of the first aspect.

It is to be understood that the above general description and the detailed description hereinafter are merely illustrative and explanatory, which do not limit the present disclosure.

BRIEF DESCRIPTION OF DRAWINGS

The accompanying drawings illustrated here are used to provide a further understanding of the embodiments of the present disclosure, which constitute a part of the present application. The examples and their explanations of the embodiments of the present disclosure are used to explain the embodiments of the present disclosure, which do not constitute an improper limitation on the embodiments of the present disclosure. In the accompanying drawings.

The accompanying drawings here are incorporated into the specification, which constitute a part of this specification, illustrating embodiments consistent with the embodiments of the present disclosure. The accompanying drawings, together with the specification, are used to explain the principles of the embodiments of the present disclosure.

DETAILED DESCRIPTION OF THE INVENTION

Figure 1:
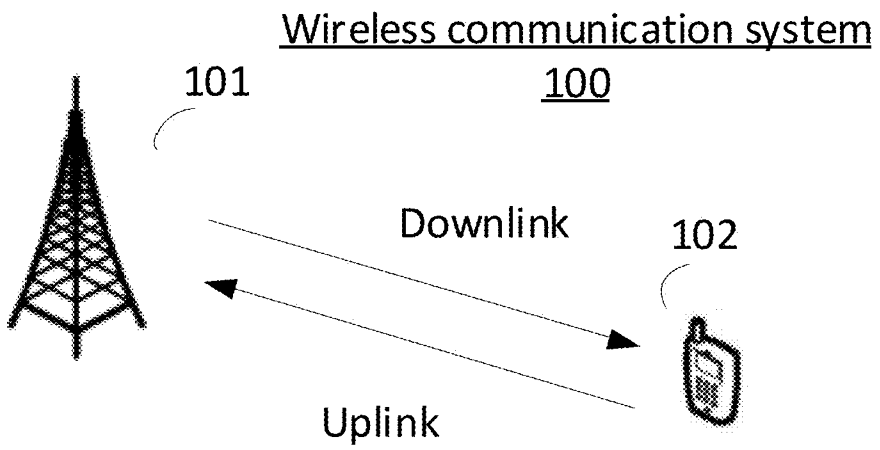
FIG. 1 is a schematic diagram of an architecture of a wireless communication system provided by an embodiment of the present disclosure.

The embodiments of the present disclosure are further illustrated hereinafter in conjunction with the accompanying drawings and specific embodiments.

Examples will be illustrated in detail here, and instances of which are represented in the accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, they are merely examples of a device and method consistent with some aspects of the disclosure as detailed in the appended claims.

Terms used in the disclosure are merely for the purpose of describing the particular examples, and are not intended to limit the disclosure. The singular forms “a”, “the” and “this” used in the disclosure and the appended claims are also intended to include the plural forms, unless the context clearly indicates otherwise. It is to be further understood that a term “and/or” used in this text refers to and contains any or all possible combinations of one or more associated listed items.

It is to be understood that terms “first”, “second”, “third” and the like may be employed in the disclosure to describe various information, but these pieces of information should not be limited to these terms. These terms are merely used to distinguish the same type of information from one another. For example, in a case of not departing from the scope of the disclosure, first information may also be called second information, and similarly, the second information may also be called the first information. Depending on the context, for example, the word “if”, as used here, may be interpreted as “at the time of”, “when”, or “in response to determining”.

A description will be made in detail of the embodiments of the present disclosure, examples of which are illustrated in the accompanying drawings. Reference signs which are the same or similar throughout the accompanying drawings represent the same or similar elements. The embodiments described below with reference to the accompanying drawings are illustrative and are intended to explain the present disclosure, rather than being construed as limitations to the present disclosure.

The PDCCH monitoring adaptation mechanism may include PDCCH skipping and search space set group (SSSG) switching.

Under different PDCCH monitoring behavior configurations, an information field indicating a PDCCH monitoring adaptation behavior may be two bits or one bit. For example, in case that a base station configures two SSSGs for the UE, the bit field occupies one bit. In case that the base station configures three SSSGs for the UE, the bit field occupies two bits. In case that the base station configures two SSSGs and PDCCH skipping for the UE, the bit field occupies two bits. In case that PDCCH skipping is configured, and the number of PDCCH skipping duration is one, the bit field occupies one bit. In case that PDCCH skipping is configured, and the number of PDCCH skipping durations is two or three, the bit field occupies two bits.

In the related art, the SSSG switching method may correspond to, up to, two SSSGs. The UE may be configured with a cellGroupsForSwitchList. In this case, the SSSG switching indication is applied to all cells in a cell group. A serving cell (which may also be referred to as a member carrier) can only belong to one cell group. In case the cell is not configured with searchSpaceGroupIdList, i.e., the cell is not configured with two SSSGs, the SSSG switching indication is not applicable.

In case that up to 3 SSSGs and PDCCH skipping are applied, how to appropriately indicate the PDCCH monitoring behavior in the same cell group is a technical problem to be solved.

As shown in FIG. 1, a monitoring method provided by an embodiment of the present disclosure may be applied to a wireless communication system 100. The wireless communication system may include, but is not limited to, a network device 101 and user equipment 102. The user equipment 102 is configured to support carrier aggregation. The user equipment 102 may be connected to a plurality of carrier units of the network device 101, including a primary carrier unit and one or more secondary carrier units.

It is to be understood that the wireless communication system 100 may be applicable to both a low-frequency scenario and a high-frequency scenario. The application scenarios of the wireless communication system 100 include, but are not limited to, a long-term evolution (LTE) system, an LTE frequency division duplex (FDD) system, an LTE time division duplex (TDD) system, a worldwide interoperability for micro wave access (WiMAX) communication system, a cloud radio access network (CRAN) system, a future 5th-Generation (5G) system, a new radio (NR) communication system, or a future evolved public land mobile network (PLMN) system, etc.

The user equipment 102 shown above may be user equipment (UE), a terminal, an access terminal, a terminal unit, a terminal station, a mobile station (MS), a remote station, a remote terminal, a mobile terminal, a wireless communication device, a terminal agent, or the user equipment, etc. The user equipment 102 may have a wireless transceiving function, capable of communicating (e.g., wirelessly) with one or more network devices 101 of one or more communication systems, and accepting network services provided by the network devices 101. The network device 101 herein includes, but is not limited to, a base station as shown.

The user equipment 102 may be a cellular phone, a cordless phone, a session initiation protocol (SIP) phone, a wireless local loop (WLL) station, a personal digital assistant (PDA) device, a handheld device with a wireless communication function, a computing device, or other processing device connected to a wireless modem, a vehicle-mounted device, a wearable device, user equipment in a future 5G network, or user equipment in a future evolved PLMN, etc.

The network device 101 may be an access network device (or referred to as an access network site). The access network device refers to a device that provides a network access function, such as a radio access network (RAN) base station. The network device may specifically include a base station (BS) device, or include a base station device and a wireless resource management device configured to control the base station device, etc. The network device may also include a relay station (a relay device), an access point, a base station in the future 5G network, a base station in the future evolved PLMN network, or an NR base station, etc. The network device may be a wearable or vehicle-mounted device. The network device may also be a communication chip with a communication module.

For example, the network device 101 includes, but is not limited to: a next-generation base station (gnodeB, gNB) in 5G, an evolved node B (eNB) in an LTE system, a radio network controller (RNC), a node B (NB) in a WCDMA system, a wireless controller under a CRAN system, a base station controller (BSC), a base transceiver station (BTS) in a GSM system or a CDMA system, a home base station (e.g., home evolved nodeB, or home node B, HNB), a baseband unit (BBU), a transmitting and receiving point (TRP), a transmitting point (TP), or a mobile switching center, etc.

Figure 2:
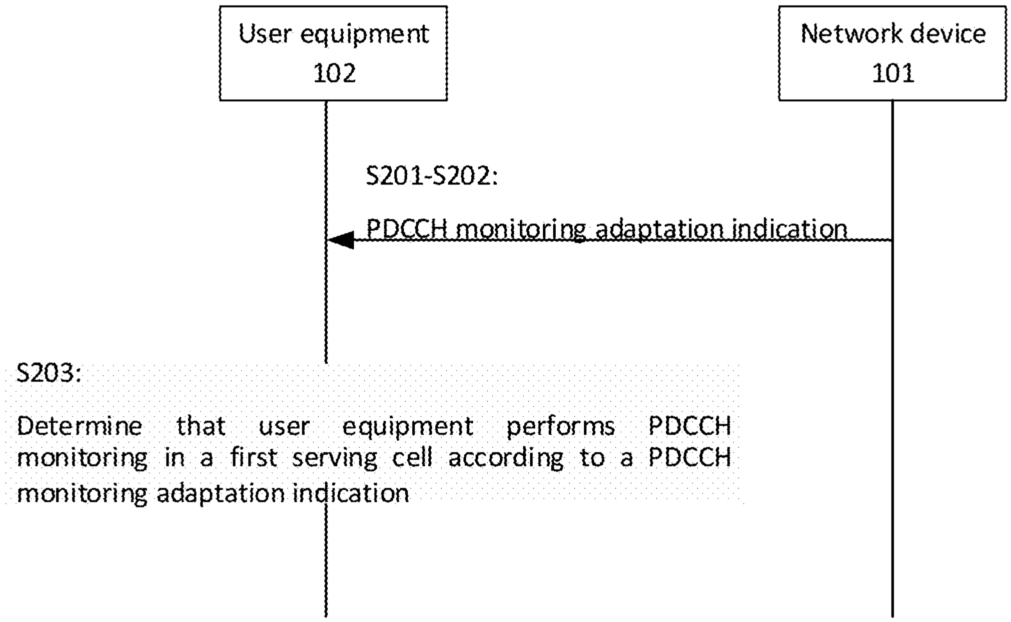
FIG. 2 is a flowchart of a monitoring method illustrated according to an example.

According to an embodiment of the present disclosure, a monitoring method is provided. FIG. 2 is a flowchart of a monitoring method illustrated according to an example. As shown in FIG. 2, the method includes steps as follows:

step S201, a network device 101 sends, on a first serving cell, a PDCCH monitoring adaptation indication to a user equipment;

step S202, the user equipment 102, on the first serving cell, receives the PDCCH monitoring adaptation indication; and step S203, the user equipment 102 determines that the user equipment performs PDCCH monitoring in the first serving cell according to the PDCCH monitoring adaptation indication.

In this method, after receiving the PDCCH monitoring adaptation indication on the first serving cell, the user equipment 102 determines, taking into consideration a cell group to which the first serving cell belongs, on which serving cells in the cell group the PDCCH monitoring adaptation indication may take effect, which can schedule network resources appropriately, thereby improving network performance.

In some examples, the first serving cell refers to one of the serving cells corresponding to the user equipment 102 and does not indicate the first position among the serving cells according to any specific sorting rule.

In some examples, the serving cells are referred to as member carriers.

In some examples, in step S201, the network device 101 sends the PDCCH monitoring adaptation indication to the user equipment on the first serving cell, which includes: sending, by the network device 101, downlink control information (DCI) on the first serving cell, and the DCI carries the PDCCH monitoring adaptation indication.

In step S202, the user equipment 102 receives the PDCCH monitoring adaptation indication on the first serving cell, which includes: receiving, by the user equipment 102, the DCI on the first serving cell, and the DCI carries the PDCCH monitoring adaptation indication. This DCI may be referred to as PDCCH monitoring adaptation indication DCI.

In some examples, in step S203, the user equipment 102 determines that the user equipment 102 performs PDCCH monitoring in the first serving cell according to the PDCCH monitoring adaptation indication, which is referred to as determining that the PDCCH monitoring adaptation indication takes effect in the first serving cell.

In some examples, in step S203, performing PDCCH monitoring according to the PDCCH monitoring adaptation indication includes one of the following modes:

1. not activating PDCCH skipping;
2. stopping PDCCH monitoring (i.e., performing PDCCH skipping) during a duration X, where the network device may dynamically indicate the value of X in the DCI;
3. stopping monitoring search spaces in SSSG #1 and SSSG #2 (in case there is such configuration), and monitoring the search space in SSSG #0;
4. stopping monitoring the search spaces in SSSG #0 and SSSG #2 (in case that there is such configuration), and monitoring the search space in SSSG #1;
5. stopping monitoring the search spaces in SSSG #0 and SSSG #1, and monitoring the search space in SSSG #2 (in case that there is such configuration).

In some examples, in step S203, the user equipment 102 determines that the user equipment 102 performs PDCCH monitoring in the first serving cell according to the PDCCH monitoring adaptation indication, which includes: determining, by the user equipment, that the user equipment 102 only performs PDCCH monitoring in the first serving cell according to the PDCCH monitoring adaptation indication, and does not perform PDCCH monitoring in other serving cells according to the PDCCH monitoring adaptation indication.

In some examples, in step S203, the user equipment 102 determines that the PDCCH monitoring adaptation indication takes effect in the first serving cell and does not take effect in other serving cells. The term "taking effect" refers to performing PDCCH monitoring as indicated.

In some examples, in step S203, the user equipment 102 determines that the user equipment 102 performs PDCCH monitoring in the first serving cell according to the PDCCH monitoring adaptation indication, which includes: determining that the user equipment performs, according to the PDCCH monitoring adaptation indication, PDCCH monitoring in each of the serving cells in a cell group to which the first serving cell belongs. In other words, the user equipment determines that the user equipment 102 performs PDCCH monitoring in the first serving cell according to the PDCCH monitoring adaptation indication, and performs, according to the PDCCH monitoring adaptation indication, PDCCH monitoring in serving cells other than the first serving cell in the cell group to which the first serving cell belongs.

In some examples, in step S203, the user equipment 102 determines that the PDCCH monitoring adaptation indication takes effect in the first serving cell and in serving cells other than the first serving cell in the cell group to which the first serving cell belongs.

In some examples, in step S203, the user equipment 102 determines that the PDCCH monitoring adaptation indication takes effect in all of the serving cells in the cell group to which the first serving cell belongs.

In some examples, in step S203, the user equipment 102 determines that the PDCCH monitoring adaptation indication takes effect in any of the serving cells in the cell group to which the first serving cell belongs.

In some examples, in step S203, the user equipment 102 determines that the PDCCH monitoring adaptation indication takes effect in each of the serving cells in the cell group to which the first serving cell belongs. "Taking effect" refers to performing PDCCH monitoring as indicated.

In the embodiment of the present disclosure, after receiving the PDCCH monitoring adaptation indication on the first serving cell, the user equipment determines, taking into consideration the cell group to which the first serving cell belongs, on which serving cells in the cell group the PDCCH monitoring adaptation indication may take effect, thereby enabling appropriate network resource scheduling to improve network performance.

Figure 3:
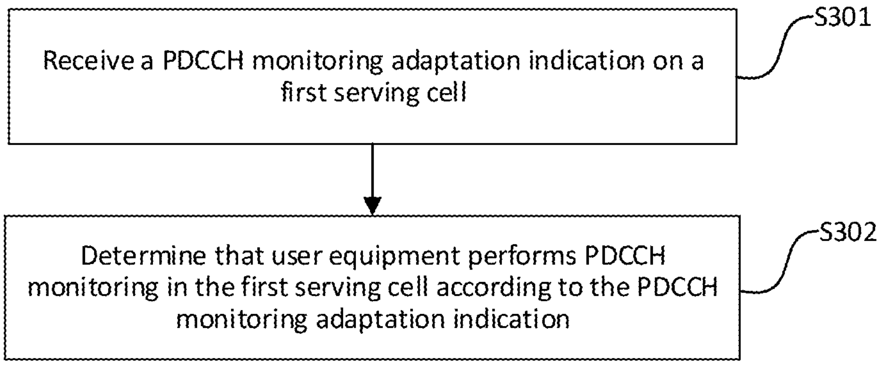
FIG. 3 is a flowchart of a monitoring method illustrated according to an example.

According to an embodiment of the present disclosure, a monitoring method is provided. The method is performed by user equipment 102. FIG. 3 is a flowchart of a monitoring method illustrated according to an example. As shown in FIG. 3, the method includes steps as follows:

step S301, receiving a PDCCH monitoring adaptation indication on a first serving cell; and step S302, determining that the user equipment performs PDCCH monitoring in the first serving cell according to the PDCCH monitoring adaptation indication.

In some examples, the first serving cell refers to one of the serving cells corresponding to the user equipment 102 and does not indicate the first position among the serving cells according to any specific sorting rule.

In some examples, receiving a PDCCH monitoring adaptation indication on a first serving cell includes: receiving downlink control information (DCI) on the first serving cell, the DCI carrying the PDCCH monitoring adaptation indication.

In some examples, determining that the user equipment performs PDCCH monitoring in the first serving cell according to the PDCCH monitoring adaptation indication is referred to as determining that the PDCCH monitoring adaptation indication takes effect in the first serving cell.

In some examples, the step of performing PDCCH monitoring according to the PDCCH monitoring adaptation indication includes one of the following modes:

1. not activating PDCCH skipping;
2. stopping PDCCH monitoring (i.e., performing PDCCH skipping) during a duration X, where the network device may dynamically indicate the value of X in the DCI;
3. stopping monitoring search spaces in SSSG #1 and SSSG #2 (in case there is such configuration), and monitoring the search space in SSSG #0;
4. stopping monitoring the search spaces in SSSG #0 and SSSG #2 (in case that there is such configuration), and monitoring the search space in SSSG #1;
5. stopping monitoring the search spaces in SSSG #0 and SSSG #1 (in case that there is such configuration), and monitoring the search space in SSSG #2.

In some examples, in step S302, determining that the user equipment performs PDCCH monitoring in the first serving cell according to the PDCCH monitoring adaptation indication includes: determining that the user equipment only performs PDCCH monitoring in the first serving cell according to the PDCCH monitoring adaptation indication and does not perform PDCCH monitoring in other serving cells according to the PDCCH monitoring adaptation indication.

In some examples, in step S302, the user equipment 102 determines that the PDCCH monitoring adaptation indication takes effect in the first serving cell and does not take effect in other serving cells. "Taking effect" refers to performing PDCCH monitoring as indicated.

In some examples, in step S302, determining that the user equipment 102 performs PDCCH monitoring in the first serving cell according to the PDCCH monitoring adaptation indication includes: determining that the user equipment performs, according to the PDCCH monitoring adaptation indication, PDCCH monitoring in each of the serving cells in a cell group to which the first serving cell belongs. In other words, the user equipment determines that the user equipment 102 performs PDCCH monitoring in the first serving cell according to the PDCCH monitoring adaptation indication, and performs, according to the PDCCH monitoring adaptation indication, PDCCH monitoring in serving cells other than the first serving cell in the cell group to which the first serving cell belongs.

In some examples, in step S302, it is determined that the PDCCH monitoring adaptation indication takes effect in the first serving cell and in serving cells other than the first serving cell in the cell group to which the first serving cell belongs. "Taking effect" refers to performing PDCCH monitoring as indicated.

In some examples, in step S302, it is determined that the PDCCH monitoring adaptation indication takes effect in all of the serving cells in the cell group to which the first serving cell belongs.

In some examples, in step S302, it is determined that the PDCCH monitoring adaptation indication takes effect in any one of the serving cells in the cell group to which the first serving cell belongs.

In some examples, in step S302, it is determined that the PDCCH monitoring adaptation indication takes effect in each of the serving cells in the cell group to which the first serving cell belongs.

In the embodiment of the present disclosure, after receiving the PDCCH monitoring adaptation indication on the first serving cell, the user equipment 102 determines, taking into consideration the cell group to which the first serving cell belongs, on which serving cells in the cell group the PDCCH monitoring adaptation indication may take effect, thereby enabling appropriate network resources scheduling to improve network performance.

Figure 4:
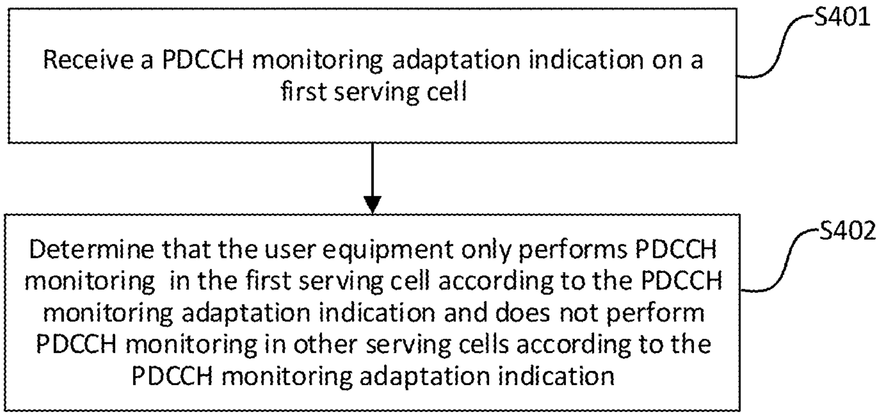
FIG. 4 is a flowchart of a monitoring method illustrated according to an example.

According to an embodiment of the present disclosure, a monitoring method is provided. The method is performed by the user equipment 102. FIG. 4 is a flowchart of a monitoring method illustrated according to an example. As shown in FIG. 4, the method includes steps as follows:

step S401, receiving a PDCCH monitoring adaptation indication on a first serving cell; and step S402, determining that the user equipment only performs PDCCH monitoring in the first serving cell according to the PDCCH monitoring adaptation indication and does not perform PDCCH monitoring in other serving cells according to the PDCCH monitoring adaptation indication.

In some examples, the first serving cell refers to one of the serving cells corresponding to the user equipment 102 and does not indicate the first position among the serving cells according to any specific sorting rule.

In some examples, receiving a PDCCH monitoring adaptation indication on a first serving cell includes: receiving downlink control information (DCI) on the first serving cell, where the DCI carries the PDCCH monitoring adaptation indication.

In some examples, determining that the user equipment performs PDCCH monitoring in the first serving cell according to the PDCCH monitoring adaptation indication is referred to as determining that the PDCCH monitoring adaptation indication takes effect in the first serving cell.

In some examples, performing PDCCH monitoring according to the PDCCH monitoring adaptation indication includes one of the following modes:

1. not activating PDCCH skipping;
2. stopping PDCCH monitoring (i.e., performing PDCCH skipping) during a duration X, where the network device may dynamically indicate the value of X in the DCI;
3. stopping monitoring search spaces in SSSG #1 and SSSG #2 (in case that there is such configuration), and monitoring the search space in SSSG #0;
4. stopping monitoring the search spaces in SSSG #0 and SSSG #2 (in case that there is such configuration), and monitoring the search space in SSSG #1;
5. stopping monitoring the search spaces in SSSG #0 and SSSG #1 (in case that there is such configuration), and monitoring the search space in SSSG #2.

In some examples, in step S302, the user equipment 102 determines that the PDCCH monitoring adaptation indication takes effect in the first serving cell and does not take effect in other serving cells. "Taking effect" refers to performing PDCCH monitoring as indicated.

In the embodiment of the present disclosure, after receiving the PDCCH monitoring adaptation indication on the first serving cell, the user equipment 102 determines that the PDCCH monitoring adaptation indication only takes effect in the first serving cell and does not take effect in other serving cells, thereby saving signaling resources.

Figure 5:
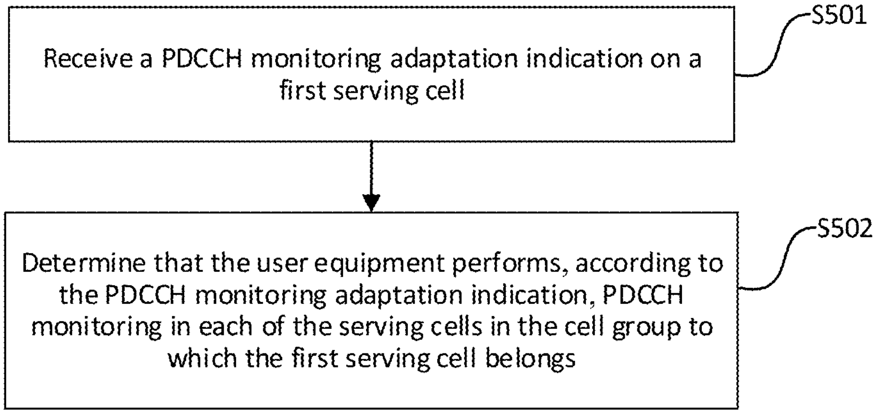
FIG. 5 is a flowchart of a monitoring method illustrated according to an example.

According to an embodiment of the present disclosure, a monitoring method is provided. The method is performed by the user equipment 102. FIG. 5 is a flowchart of a monitoring method illustrated according to an example. As shown in FIG. 5, the method includes steps as follows:

step S501, receiving the PDCCH monitoring adaptation indication on the first serving cell; and step S502, determining that the user equipment performs, according to the PDCCH monitoring adaptation indication, PDCCH monitoring in each of the serving cells in the cell group to which the first serving cell belongs.

In some examples, the first serving cell refers to one of the serving cells corresponding to the user equipment 102 and does not indicate the first position among the serving cells according to any specific sorting rule.

In some examples, receiving the PDCCH monitoring adaptation indication on the first serving cell includes: receiving downlink control information (DCI) on the first serving cell, the DCI carrying the PDCCH monitoring adaptation indication.

In some examples, determining that the user equipment performs PDCCH monitoring in the first serving cell according to the PDCCH monitoring adaptation indication is referred to as determining that the PDCCH monitoring adaptation indication takes effect in the first serving cell. "Taking effect" refers to performing PDCCH monitoring as indicated.

In some examples, performing PDCCH monitoring according to the PDCCH monitoring adaptation indication includes one of the following modes:

1. not activating PDCCH skipping;
2. stopping PDCCH monitoring (i.e., performing PDCCH skipping) during a duration X, where the network device may dynamically indicate the value of X in the DCI;
3. stopping monitoring search spaces in SSSG #1 and SSSG #2 (in case that there is such configuration), and monitoring the search space in SSSG #0;
4. stopping monitoring the search spaces in SSSG #0 and SSSG #2 (in case that there is such configuration), and monitoring the search space in SSSG #1;
5. stopping monitoring the search spaces in SSSG #0 and SSSG #1 (in case that there is such configuration), and monitoring the search space in SSSG #2.

In some examples, determining that the user equipment performs, according to the PDCCH monitoring adaptation indication, PDCCH monitoring in each of the serving cells in a cell group to which the first serving cell belongs includes: determining that the user equipment performs, according to the PDCCH monitoring adaptation indication, PDCCH monitoring in all of the serving cells in the cell group to which the first serving cell belong.

In some examples, the cell group is a cell group for a switch configured by the network device, or a cell group determined based on a protocol. For example, the cell group for switch is CellGroupForSwitch in the R16 protocol; for another example, the cell group is CellGroupForPDCCH-monitoring Adaptation.

In some examples, the PDCCH monitoring adaptation indication is configured to indicate at least one of the following: PDCCH skipping; and SSSG switching.

In some examples, the PDCCH monitoring adaptation indication is configured to indicate the PDCCH skipping.

In some examples, the PDCCH monitoring adaptation indication is configured to indicate the SSSG switching.

In some examples, the PDCCH monitoring adaptation indication is configured to indicate the PDCCH skipping and the SSSG switching.

In some examples, active BWPs of all serving cells in the cell group have the same PDCCH skipping configuration; or configured BWPs of all serving cells in the cell group have the same PDCCH skipping configuration.

In some examples, the active BWPs of all the serving cells in the cell group with the same PDCCH skipping configuration includes: the active BWPs of all the serving cells in the cell group are not configured with PDCCH skipping configurations; or the active BWPs of all the serving cells in the cell group are configured with the PDCCH skipping configurations, where the number of PDCCH skipping durations in each PDCCH skipping configuration is the same.

The configured BWPs of all the serving cells in the cell group with the same PDCCH skipping configuration includes: the configured BWPs of all the serving cells in the cell group are not configured with PDCCH skipping configurations; or the configured BWPs of all the serving cells in the cell group are configured with the PDCCH skipping configurations, where the number of PDCCH skipping durations in each PDCCH skipping configuration is the same.

In some examples, the active BWPs of all the serving cells in the cell group have the same SSSG configuration; or the configured BWPs of all the serving cells in the cell group have the same SSSG configuration.

In some examples, the active BWPs of all the serving cells in the cell group with the same SSSG configuration includes: the active BWPs of all the serving cells in the cell group are not configured with SSSG configurations; or the active BWPs of all the serving cells in the cell group are configured with the SSSG configurations, and the number of SSSGs in each SSSG configuration is the same.

The configured BWPs of all the serving cells in the cell group with the same SSSG configuration includes: the configured BWPs of all the serving cells in the cell group are not configured with any SSSG configuration; or the configured BWPs of all the serving cells in the cell group are configured with the SSSG configurations, and the number of SSSGs in each SSSG configuration is the same.

In the embodiment of the present disclosure, after receiving the PDCCH monitoring adaptation indication on the first serving cell, the user equipment 102 determines that the PDCCH monitoring adaptation indication takes effect in each of the serving cells in the cell group to which the first serving cell belongs, thereby saving power consumption of the user equipment.

Figure 6:
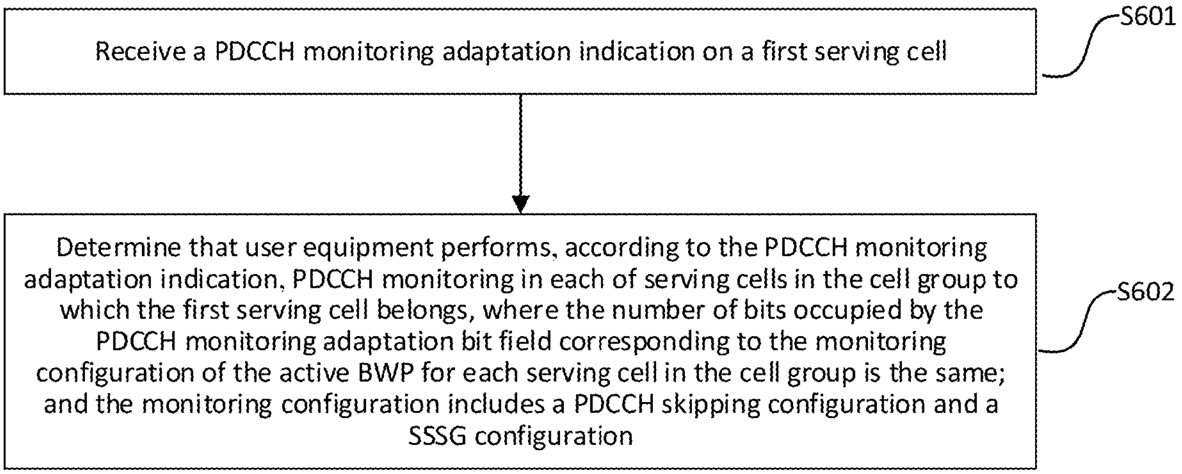
FIG. 6 is a flowchart of a monitoring method illustrated according to an example.

According to an embodiment of the present disclosure, a monitoring method is provided. The method is performed by the user equipment 102. FIG. 6 is a flowchart of a monitoring method illustrated according to an example. As shown in FIG. 6, the method includes steps as follows:

step S601, receiving a PDCCH monitoring adaptation indication on a first serving cell; and step S602, determining that the user equipment performs, according to the PDCCH monitoring adaptation indication, PDCCH monitoring in each of serving cells in the cell group to which the first serving cell belongs, where the number of bits occupied by the PDCCH monitoring adaptation bit field (e.g., the bit size of the PDCCH monitoring adaptation bit field) corresponding to the monitoring configuration of the active BWP for each serving cell in the cell group is the same, and the monitoring configuration includes a PDCCH skipping configuration and a SSSG configuration.

In the embodiment of the present disclosure, after receiving the PDCCH monitoring adaptation indication on the first serving cell, the user equipment 102 determines that the PDCCH monitoring adaptation indication takes effect in serving cell(s) that meet specific condition(s) in the cell group to which the first serving cell belongs, thereby saving power consumption of the user equipment while saving signaling resources.

Figure 7:
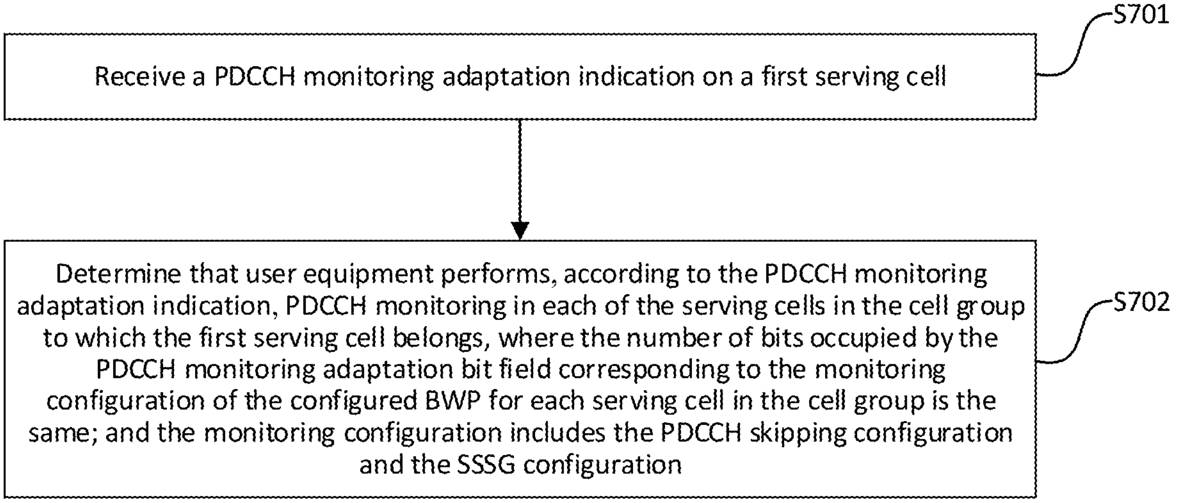
FIG. 7 is a flowchart of a monitoring method illustrated according to an example.

According to an embodiment of the present disclosure, a monitoring method is provided. The method is performed by the user equipment 102. FIG. 7 is a flowchart of a monitoring method illustrated according to an example. As shown in FIG. 7, the method includes steps as follows:

step S701, receiving a PDCCH monitoring adaptation indication on a first serving cell; and step S702, determining that the user equipment performs, according to the PDCCH monitoring adaptation indication, PDCCH monitoring in each of serving cells in a cell group to which the first serving cell belongs, where the number of bits occupied by the PDCCH monitoring adaptation bit field corresponding to the monitoring configuration of the configured BWP for each serving cell in the cell group is the same, where the monitoring configuration includes a PDCCH skipping configuration and a SSSG configuration.

In the embodiment of the present disclosure, after receiving the PDCCH monitoring adaptation indication on the first serving cell, the user equipment 102 determines that the PDCCH monitoring adaptation indication takes effect in serving cell(s) that meet specific condition(s) in the cell group to which the first serving cell belongs, thereby saving power consumption of the user equipment while saving signaling resources.

Figure 8:
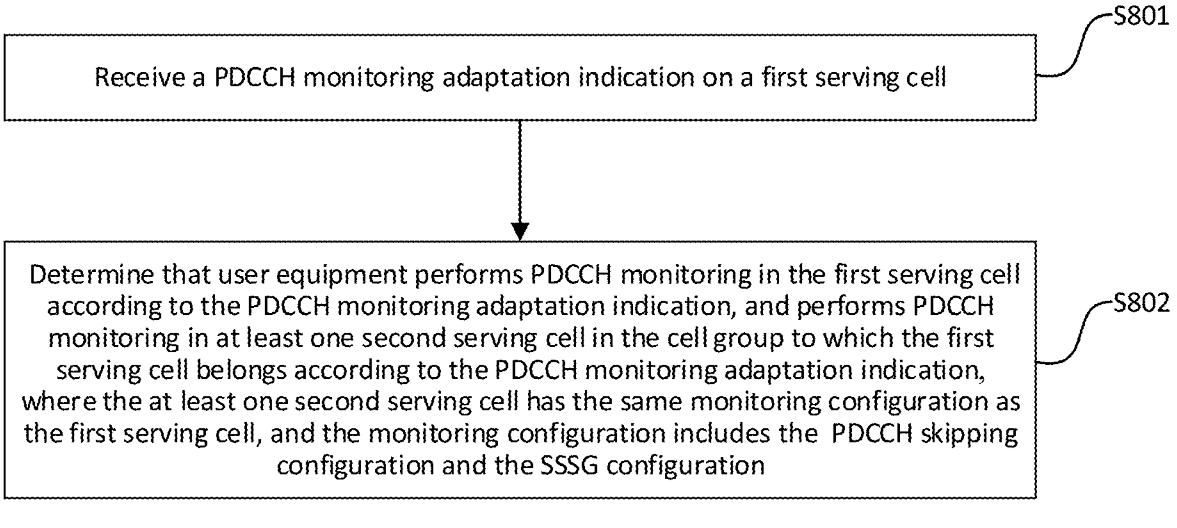
FIG. 8 is a flowchart of a monitoring method illustrated according to an example.

According to an embodiment of the present disclosure, a monitoring method is provided. The monitoring method is performed by the user equipment 102. FIG. 8 is a flowchart of a monitoring method illustrated according to an example. As shown in FIG. 8, the method includes steps as follows:

step S801, receiving a PDCCH monitoring adaptation indication on a first serving cell; and step S802, determining that the user equipment performs PDCCH monitoring in the first serving cell according to the PDCCH monitoring adaptation indication, and performs PDCCH monitoring in at least one second serving cell in the cell group to which the first serving cell belongs according to the PDCCH monitoring adaptation indication, where the at least one second serving cell has the same monitoring configuration as the first serving cell, and the monitoring configuration includes a PDCCH skipping configuration and a SSSG configuration.

In some examples, step S802 corresponds to the case where it is determined that the PDCCH monitoring adaptation indication takes effect in the serving cell(s) that is/are in the cell group to which the first serving cell belongs and has/have the same monitoring configuration as the first serving cell.

In some examples, step S802 further includes: determining that the UE does not perform PDCCH monitoring in at least one third serving cell in the cell group to which the first serving cell belongs, according to the PDCCH monitoring adaptation indication, where the at least one third serving cell has a different monitoring configuration from the first serving cell, and the monitoring configuration includes the PDCCH skipping configuration and the SSSG configuration.

In some examples, step S802 further includes: determining that the PDCCH monitoring adaptation indication does not take effect in serving cell(s) that is/are in the cell group to which the first serving cell belongs but has/have different monitoring configuration(s) from the first serving cell.

In the embodiment of the present disclosure, after receiving the PDCCH monitoring adaptation indication on the first serving cell, the user equipment 102 determines that the PDCCH monitoring adaptation indication takes effect in serving cell(s) that meets/meet specific condition(s) in the cell group to which the first serving cell belongs, thereby saving power consumption of the user equipment while saving signaling resources.

Figure 9:
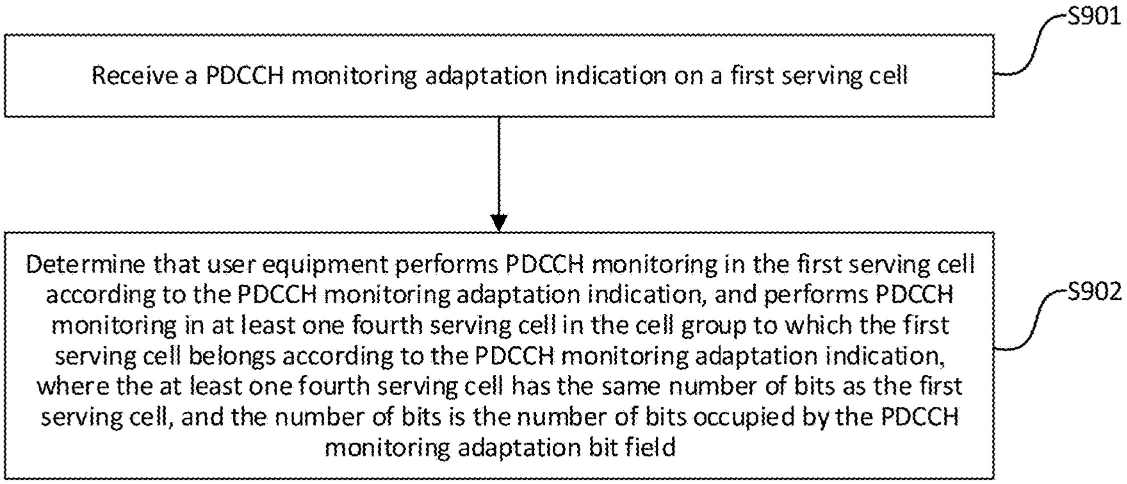
FIG. 9 is a flowchart of a monitoring method illustrated according to an example.

According to an embodiment of the present disclosure, a monitoring method is provided. The monitoring method is performed by the user equipment 102. FIG. 9 is a flowchart of a monitoring method illustrated according to an example. As shown in FIG. 9, the method includes steps as follows:

step S901, receiving a PDCCH monitoring adaptation indication on a first serving cell; and step S902, determining that the user equipment performs PDCCH monitoring in the first serving cell according to the PDCCH monitoring adaptation indication, and performs PDCCH monitoring in at least one fourth serving cell in the cell group to which the first serving cell belongs according to the PDCCH monitoring adaptation indication, where the at least one fourth serving cell has the same number of bits as the first serving cell, where the number of bits is the number of bits occupied by the PDCCH monitoring adaptation bit field.

In some examples, step S902 corresponds to the case where it is determined that the PDCCH monitoring adaptation indication takes effect in the serving cell(s) that is/are in the cell group to which the first serving cell belongs and has/have the same number of bits occupied by the PDCCH monitoring adaptation bit field(s) as the first serving cell. "Taking effect" refers to performing PDCCH monitoring as indicated.

In some examples, step S902 further includes: determining that the user equipment does not perform PDCCH monitoring in at least one fifth serving cell in the cell group to which the first serving cell belongs according to the PDCCH monitoring adaptation indication, where the at least one fifth serving cell has a different number of bits from the first serving cell, where the number of bits is the number of bits occupied by the PDCCH monitoring adaptation bit field.

In some examples, step S802 further includes: determining that the PDCCH monitoring adaptation indication does not take effect in serving cell(s) that is/are in the cell group to which the first serving cell belongs but without the same number of bits occupied by the PDCCH monitoring adaptation bit field as the first serving cell. "Taking effect" refers to performing PDCCH monitoring as indicated.

In the embodiment of the present disclosure, after receiving the PDCCH monitoring adaptation indication on the first serving cell, the user equipment 102 determines that the PDCCH monitoring adaptation indication takes effect in serving cell(s) that meets/meet specific condition(s) in the cell group to which the first serving cell belongs, thereby saving power consumption of the user equipment while saving signaling resources.

Figure 10:
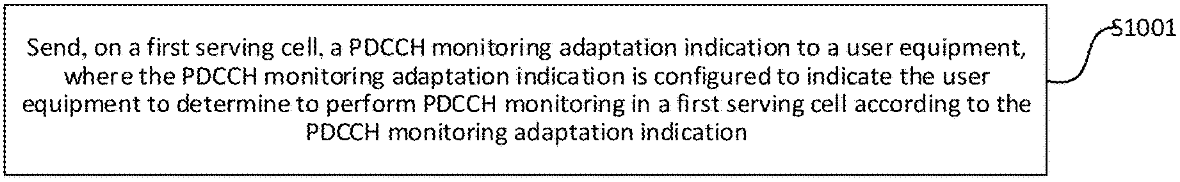
FIG. 10 is a flowchart of a monitoring method illustrated according to an example.

According to an embodiment of the present disclosure, a monitoring method is provided. The monitoring method is performed by the network device 101. FIG. 10 is a flowchart of a monitoring method illustrated according to an example. As shown in FIG. 10, the method includes steps as follows:

step S1001, sending, on a first serving cell, a PDCCH monitoring adaptation indication to user equipment, where the PDCCH monitoring adaptation indication is configured to indicate to the user equipment to determine to perform PDCCH monitoring in the first serving cell according to the PDCCH monitoring adaptation indication.

In some examples, the first serving cell refers to one of the serving cells corresponding to the user equipment 102, and does not indicate the first position among the serving cells according to any specific sorting rule.

In some examples, the sending the PDCCH monitoring adaptation indication on the first serving cell includes: sending downlink control information (DCI) on the first serving cell, where the DCI carries the PDCCH monitoring adaptation indication.

In some examples, determining that the user equipment performs PDCCH monitoring in the first serving cell according to the PDCCH monitoring adaptation indication is referred to as determining that the PDCCH monitoring adaptation indication takes effect in the first serving cell.

In some examples, performing PDCCH monitoring according to the PDCCH monitoring adaptation indication includes one of the following modes:

1. not activating PDCCH skipping;
2. stopping PDCCH monitoring (i.e., performing PDCCH skipping) during a duration X, where the network device may dynamically indicate the value of X in the DCI;
3. stopping monitoring search spaces in SSSG #1 and SSSG #2 (in case there is such configuration), and monitoring the search space in SSSG #0;
4. stopping monitoring the search spaces in SSSG #0 and SSSG #2 (in case that there is such configuration), and monitoring the search space in SSSG #1;
5. stopping monitoring the search spaces in SSSG #0 and SSSG #1 (in case that there is such configuration), and monitoring the search space in SSSG #2.

In the embodiment of the present disclosure, after sending the PDCCH monitoring adaptation indication to the user equipment 102 on the first serving cell, the network device 101, taking into consideration the cell group to which the first serving cell belongs, determines on which serving cells in the cell group the PDCCH monitoring adaptation indication may take effect. In this way, it can enable appropriate network resource scheduling to improve network performance.

According to an embodiment of the present disclosure, a monitoring method is provided. The monitoring method is performed by the network device 101. The method includes, sending, on a first serving cell, a PDCCH monitoring adaptation indication to user equipment, where the PDCCH monitoring adaptation indication is configured to indicate to the user equipment to determine to only perform PDCCH monitoring in the first serving cell according to the PDCCH monitoring adaptation indication, and not perform PDCCH monitoring in other serving cells according to the PDCCH monitoring adaptation indication.

In some examples, the first serving cell refers to one of the serving cells corresponding to the user equipment 102 and does not indicate the first position among the serving cells according to any specific sorting rule.

In some examples, receiving the PDCCH monitoring adaptation indication on the first serving cell includes: receiving downlink control information (DCI) on the first serving cell, where the DCI carries the PDCCH monitoring adaptation indication.

In some examples, determining that the user equipment performs PDCCH monitoring in the first serving cell according to the PDCCH monitoring adaptation indication is referred to as determining that the PDCCH monitoring adaptation indication takes effect in the first serving cell.

According to an embodiment of the present disclosure, a monitoring method is provided. The monitoring method is performed by the network device 101. The method includes, sending, on a first serving cell, a PDCCH monitoring adaptation indication to user equipment, where the PDCCH monitoring adaptation indication is further configured to indicate to the user equipment to determine to perform, according to the PDCCH monitoring adaptation indication, PDCCH monitoring in each of the serving cells in the cell group to which the first serving cell belongs.

In some examples, the first serving cell refers to one of the serving cells corresponding to the user equipment 102 and does not indicate the first position among the serving cells according to any specific sorting rule.

In some examples, receiving the PDCCH monitoring adaptation indication on the first serving cell includes: receiving downlink control information (DCI) on the first serving cell, where the DCI carries the PDCCH monitoring adaptation indication.

In some examples, determining that the user equipment performs PDCCH monitoring in the first serving cell according to the PDCCH monitoring adaptation indication is referred to as determining that the PDCCH monitoring adaptation indication takes effect in the first serving cell.

In some examples, the cell group is a cell group for a switch configured by the network device, or a cell group determined based on a protocol.

In some examples, the PDCCH monitoring adaptation indication is configured to indicate at least one of the following: PDCCH skipping; and SSSG switching.

In some examples, the PDCCH monitoring adaptation indication is configured to indicate PDCCH skipping.

In some examples, the PDCCH monitoring adaptation indication is configured to indicate SSSG switching.

In some examples, the PDCCH monitoring adaptation indication is configured to indicate the PDCCH skipping and the SSSG switching.

In some examples, the active BWPs of all serving cells in the cell group with the same PDCCH skipping configuration includes: the active BWPs of all the serving cells in the cell group are not configured with the PDCCH skipping configurations; or the active BWPs of all the serving cells in the cell group are configured with the PDCCH skipping configurations, and the number of PDCCH skipping durations in each PDCCH skipping configuration is the same.

The configured BWPs of all the serving cells in the cell group with the same PDCCH skipping configuration includes: the configured BWPs of all the serving cells in the cell group are not configured with PDCCH skipping configurations; or the configured BWPs of all the serving cells in the cell group are configured with the PDCCH skipping configurations, and the number of PDCCH skipping durations in each PDCCH skipping configuration is the same.

In some examples, the active BWPs of all the serving cells in the cell group have the same SSSG configuration; or the configured BWPs of all the serving cells in the cell group have the same SSSG configuration.

In some examples, the active BWPs of all the serving cells in the cell group with the same SSSG configuration includes: the active BWPs of all the serving cells in the cell group are not configured with the SSSG configurations; or the active BWPs of all the serving cells in the cell group are configured with the SSSG configurations, and the number of SSSGs in each SSSG configuration is the same.

The configured BWPs of all the serving cells in the cell group with the same SSSG configuration includes: the configured BWPs of all the serving cells in the cell group are not configured with the SSSG configurations; or the configured BWPs of all the serving cells in the cell group are configured with the SSSG configurations, and the number of SSSGs in each SSSG configuration is the same.

In some examples, the number of bits occupied by a PDCCH monitoring adaptation bit field corresponding to a monitoring configuration of the active BWP of each serving cell in the cell group is the same, where the monitoring configuration includes the PDCCH skipping configuration and the SSSG configuration.

In some examples, the number of bits occupied by a PDCCH monitoring adaptation bit field corresponding to a monitoring configuration of the configured BWP of each serving cell in the cell group is the same, where the monitoring configuration includes the PDCCH skipping configuration and the SSSG configuration.

According to an embodiment of the present disclosure, a monitoring method is provided. The monitoring method is performed by the network device 101. The method includes, sending, on a first serving cell, a PDCCH monitoring adaptation indication to user equipment, where the PDCCH monitoring adaptation indication is further configured to indicate the user equipment to determine to perform, according to the PDCCH monitoring adaptation indication, PDCCH monitoring in at least one second serving cell in the cell group to which the first serving cell belongs, where the at least one second serving cell has the same monitoring configuration as the first serving cell, and the monitoring configuration includes a PDCCH skipping configuration and a SSSG configuration.

In some examples, the PDCCH monitoring adaptation indication is further configured to indicate the user equipment to determine to not perform PDCCH monitoring in at least one third serving cell in the cell group to which the first serving cell belongs according to the PDCCH monitoring adaptation indication, where the at least one third serving cell has a different monitoring configuration from the first serving cell, and the monitoring configuration includes the PDCCH skipping configuration and the SSSG configuration.

According to an embodiment of the present disclosure, a monitoring method is provided. The monitoring method is performed by the network device 101. The method includes, sending, on a first serving cell, a PDCCH monitoring adaptation indication to a user equipment, where the PDCCH monitoring adaptation indication is configured to indicate the user equipment to determine to perform PDCCH monitoring in at least one fourth serving cell in the cell group to which the first serving cell belongs according to the PDCCH monitoring adaptation indication, where the at least one fourth serving cell has the same number of bits as the first serving cell, and the number of bits is the number of bits occupied by the PDCCH monitoring adaptation bit field.

In some examples, the PDCCH monitoring adaptation indication is configured to indicate the user equipment to determine to not perform PDCCH monitoring in at least one fifth serving cell in the cell group to which the first serving cell belongs according to the PDCCH monitoring adaptation indication, where the at least one fifth serving cell has a different number of bits from the first serving cell, and the number of bits is the number of bits occupied by the PDCCH monitoring adaptation bit field.

Based on the same concept as the above method embodiments, a communication device is further provided according to the embodiment of the present disclosure. The communication device can provide with the functions of the user equipment 102 in the above method embodiments and be configured to perform the steps provided in the above embodiments and performed by the user equipment 102. The functions may be implemented by hardware, by software, or by hardware executing corresponding software. The hardware or software includes one or more modules corresponding to the above functions.

Figure 11:
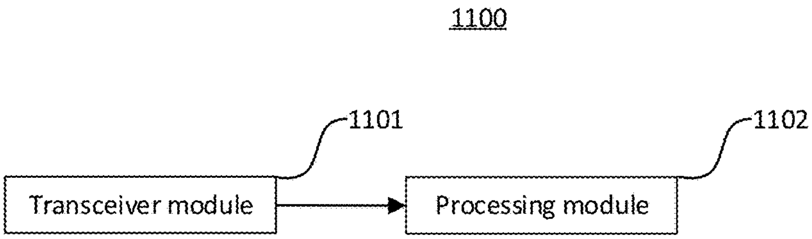
FIG. 11 is a structural diagram of a monitoring device illustrated according to an example.

In one example, the communication device 1100 as shown in FIG. 11 may serve as the user equipment 102 provided in the above method embodiments, which may perform the steps performed by the user equipment 102 in any one of the above method embodiments.

The communication device 1100 includes: a transceiver module 1101, configured to receive a PDCCH monitoring adaptation indication on a first serving cell; and a processing module 1102, configured to determine that the user equipment performs PDCCH monitoring in the first serving cell according to the PDCCH monitoring adaptation indication.

In one example, the processing module 1102 is further configured to determine that the user equipment only performs PDCCH monitoring in the first serving cell according to the PDCCH monitoring adaptation indication and does not perform PDCCH monitoring in other serving cells according to the PDCCH monitoring adaptation indication.

In one example, the processing module 1102 is further configured to determine that the user equipment performs, according to the PDCCH monitoring adaptation indication, PDCCH monitoring in each of the serving cells in a cell group to which the first serving cell belongs.

In one example, the cell group is a cell group for switch configured by a network device, or a cell group determined based on a protocol.

In one example, the PDCCH monitoring adaptation indication is configured to indicate at least one of the following: PDCCH skipping; and SSSG switching.

In one example, the PDCCH monitoring adaptation indication is configured to indicate the PDCCH skipping.

In one example, the PDCCH monitoring adaptation indication is configured to indicate the SSSG switching.

In one example, the PDCCH monitoring adaptation indication is configured to indicate the PDCCH skipping and the SSSG switching.

In one example, active bandwidth portions (BWPs) of all serving cells in the cell group have the same PDCCH skipping configuration; or configured BWPs of all the serving cells in the cell group have the same PDCCH skipping configuration.

In one example, the active BWPs of all serving cells in the cell group with the same PDCCH skipping configuration includes: the active BWPs of all the serving cells in the cell group are not configured with the PDCCH skipping configurations; or the active BWPs of all the serving cells in the cell group are configured with the PDCCH skipping configurations, and the number of PDCCH skipping durations in each PDCCH skipping configuration is the same.

The configured BWPs of all the serving cells in the cell group with the same PDCCH skipping configuration includes: the configured BWPs of all the serving cells in the cell group are not configured with the PDCCH skipping configurations; or the configured BWPs of all the serving cells in the cell group are configured with the PDCCH skipping configurations, and the number of PDCCH skipping durations in the PDCCH skipping configurations is the same.

In one example, the active BWPs of all the serving cells in the cell group have the same SSSG configuration; or the configured BWPs of all the serving cells in the cell group have the same SSSG configuration.

In one example, the active BWPs of all the serving cells in the cell group with the same SSSG configuration includes: the active BWPs of all the serving cells in the cell group are not configured with the SSSG configurations; or the active BWPs of all the serving cells in the cell group are configured with the SSSG configurations, and the number of SSSGs in the SSSG configurations is the same.

The configured BWPs of all the serving cells in the cell group with the same SSSG configuration includes: the configured BWPs of all the serving cells in the cell group are not configured with the SSSG configurations; or the configured BWPs of all the serving cells in the cell group are configured with the SSSG configurations, and the number of SSSGs in the SSSG configurations is the same.

In one example, the number of bits occupied by a PDCCH monitoring adaptation bit field corresponding to a monitoring configuration of the active BWP of each serving cell in the cell group is the same, where the monitoring configuration includes a PDCCH skipping configuration and a SSSG configuration.

In one example, the number of bits occupied by a PDCCH monitoring adaptation bit field corresponding to a monitoring configuration of the configured BWP of each serving cell in the cell group is the same, where the monitoring configuration includes the PDCCH skipping configuration and the SSSG configuration.

In one example, the processing module 1102 is further configured to determine that the user equipment performs PDCCH monitoring in at least one second serving cell in the cell group to which the first serving cell belongs according to the PDCCH monitoring adaptation indication, where the at least one second serving cell has the same monitoring configuration as the first serving cell, and the monitoring configuration includes the PDCCH skipping configuration and the SSSG configuration.

In one example, the processing module 1102 is further configured to determine that the UE does not perform PDCCH monitoring in at least one third serving cell in the cell group to which the first serving cell belongs according to the PDCCH monitoring adaptation indication, where the at least one third serving cell has a different monitoring configuration from the first serving cell, and the monitoring configuration includes the PDCCH skipping configuration and the SSSG configuration.

In one example, the processing module 1102 is further configured to determine that the UE performs PDCCH monitoring in at least one fourth serving cell in the cell group to which the first serving cell belongs according to the PDCCH monitoring adaptation indication, where the at least one fourth serving cell has the same number of bits as the first serving cell, and the number of bits is the number of bits occupied by the PDCCH monitoring adaptation bit field.

In one example, the processing module 1102 is further configured to determine that the UE does not perform PDCCH monitoring in at least one fifth serving cell in the cell group to which the first serving cell belongs according to the PDCCH monitoring adaptation indication, where the at least one fifth serving cell has a different number of bits from the first serving cell, and the number of bits is the number of bits occupied by the PDCCH monitoring adaptation bit field.

Figure 12:
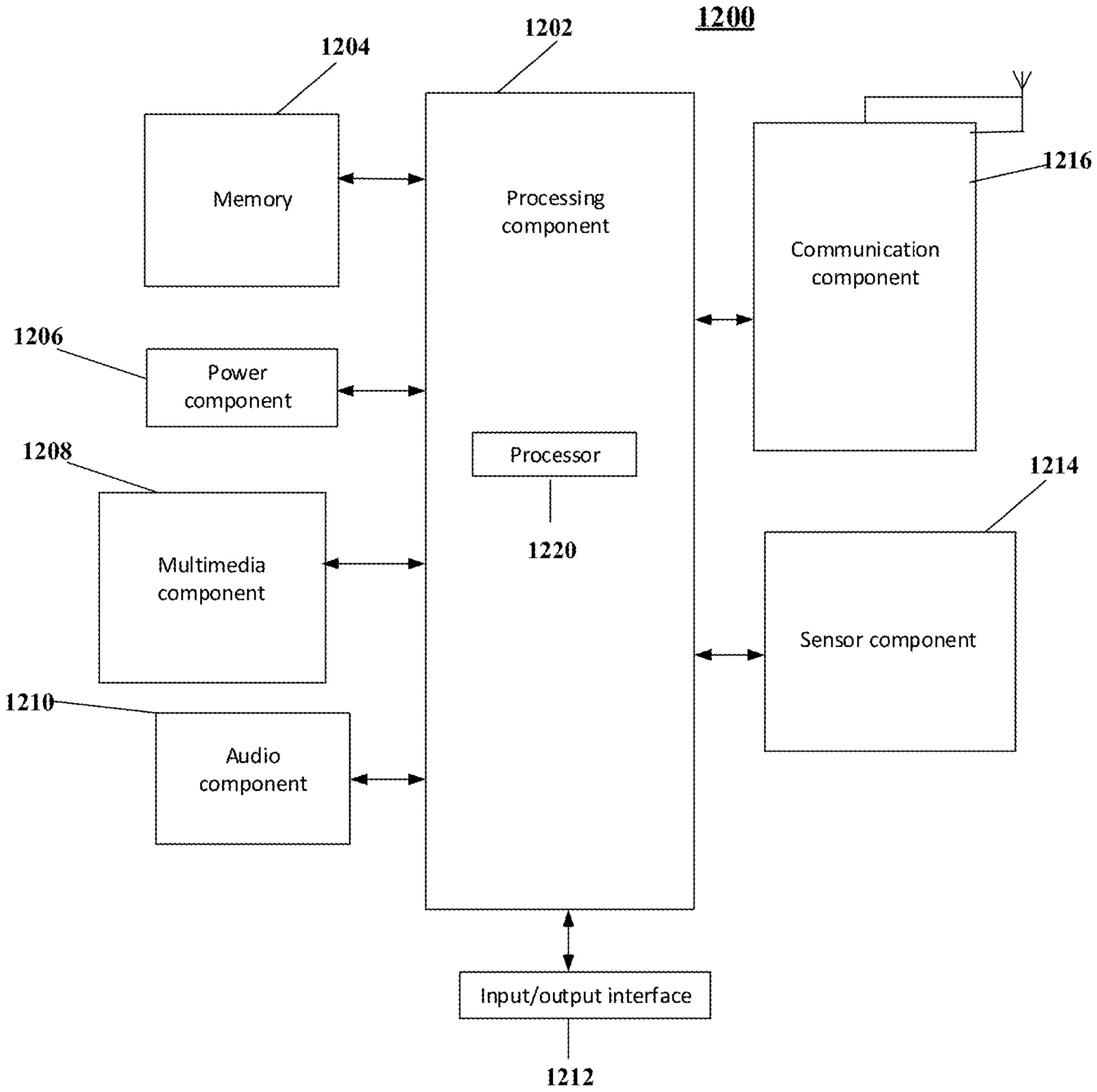
FIG. 12 is a structural diagram of a monitoring device illustrated according to an example.

FIG. 12 is a block diagram of a monitoring device 1200 illustrated according to an example. For example, the monitoring device 1200 may be a mobile phone, a computer, a digital broadcast terminal, a message transceiver device, a game console, a tablet device, a medical device, a fitness device, a personal digital assistant, etc.

Referring to FIG. 12, the monitoring device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202, in general, controls the overall operations of the monitoring device 1200, such as the operations associated with display, telephone calls, data communications, camera operations, and recording operations. The processing component 1202 may include one or more processors 1220 to execute instructions to complete all or part of the steps of the above method. In addition, the processing component 1202 may include one or more modules to facilitate interaction between the processing component 1202 and other components. For example, the processing component 1202 may include a multimedia module to facilitate the interaction between the multimedia component 1208 and the processing component 1202.

The memory 1204 is configured to store various types of data to support operations on the monitoring device 1200. Examples of such data include instructions for any applications or methods operated on the monitoring device 1200, contact data, phonebook data, messages, pictures, videos, etc. The memory 1204 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1206 provides power to various components of the monitoring device 1200. The power component 1206 may include a power management system, one or more power supplies, and any other components associated with the generation, management, and distribution of power for the monitoring device 1200.

The multimedia component 1208 includes a screen providing an output interface between the monitoring device 1200 and a user. In some embodiments, the screen may include a liquid crystal display (LCD) and a touch panel (TP). In a case where the screen includes a touch panel, the screen may be implemented as a touch screen to receive input signals from the user. The touch panel includes one or more touch sensors to sense touch, swipe, and gestures on the touch panel. The touch sensors may not only sense a boundary of a touch or swipe action, but also detect a duration and a pressure associated with the touch or swipe action. In some embodiments, the multimedia component 1208 includes a front camera and/or a rear camera. The front camera and/or the rear camera may receive external multimedia data while the monitoring device 1200 is in an operation mode, such as a photographing mode or a video mode. Each of the front and rear cameras may be a fixed optical lens system or have focus and optical zoom capability.

The audio component 1210 is configured to output and/or input audio signals. For example, the audio component 1210 includes a microphone (MIC) configured to receive an external audio signal when the monitoring device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker configured to output audio signals.

The I/O interface 1212 provides an interface between the processing component 1202 and peripheral interface modules, which may be a keyboard, a click wheel, and buttons, etc. These buttons may include, but are not limited to, a home button, a volume button, a starting button, and a locking button.

The sensor component 1214 includes one or more sensors configured to provide status assessments in various aspects for the monitoring device 1200. For example, the sensor component 1214 may detect an open/closed status of the monitoring device 1200, relative positioning of components, e.g., the display and the keypad of the monitoring device 1200. The sensor component 1214 may further detect a change in the position of the monitoring device 1200 or a component of the monitoring device 1200, a presence or absence of user contact with the monitoring device 1200, an orientation or an acceleration/deceleration of the monitoring device 1200, and a change in temperature of the monitoring device 1200. The sensor component 1214 may include a proximity sensor configured to detect the presence of nearby objects without any physical contact. The sensor component 1214 may further include a light sensor, such as a CMOS or CCD image sensor, for use in imaging applications. In some embodiments, the sensor component 1214 may further include an accelerometer sensor, a gyroscope sensor, a magnetic sensor, a pressure sensor, or a temperature sensor.

The communication component 1216 is configured to facilitate wired or wireless communication between the monitoring device 1200 and other devices. The monitoring device 1200 may access a wireless network based on a communication standard, such as WiFi, 4G or 5G, or a combination thereof. In an embodiment, the communication component 1216 receives a broadcast signal or broadcast associated information from an external broadcast management system via a broadcast channel. In an embodiment, the communication component 1216 further includes a near field communication (NFC) module to facilitate short-range communications. For example, the NFC module may be implemented based on radio frequency identification (RFID) technology, infrared data association (IrDA) technology, ultra-wideband (UWB) technology, Bluetooth (BT) technology, and other technologies.

In an embodiment, the monitoring device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an embodiment, a non-transitory computer-readable storage medium including instructions is further provided, e.g., a memory 1204 including instructions. The instructions may be executed by a processor 1220 of the monitoring device 1200 to implement the above methods. For example, the non-transitory computer-readable storage medium may be an ROM, a random access memory (RAM), a compact disc read-only memory (CD-ROM), a magnetic tape, a floppy disk, an optical data storage device, etc.

Based on the same concept as the above method embodiments, a communication device is further provided according to an embodiment of the present disclosure. The communication device may provide with the functions of the network device 101 in the above method embodiments and be configured to perform the steps provided in the above embodiments and performed by the network device 101. The functions may be implemented by hardware, by software, or by hardware executing corresponding software. The hardware or software includes one or more modules corresponding to the above functions.

Figure 13:
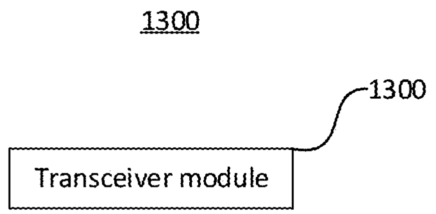
FIG. 13 is a structural diagram of a monitoring device illustrated according to an example.

In one example, the communication device 1300 as shown in FIG. 13 may serve as the network device 101 involved in the above method embodiments and perform the steps performed by the network device 101 in any one of the above method embodiments.

The communication device 1300 includes: a transceiver module 1301, configured to send a PDCCH monitoring adaptation indication to user equipment on a first serving cell, where the PDCCH monitoring adaptation indication is configured to indicate the user equipment to determine to perform PDCCH monitoring in the first serving cell according to the PDCCH monitoring adaptation indication.

In one example, the PDCCH monitoring adaptation indication is further configured to indicate to the user equipment to determine to only perform PDCCH monitoring in the first serving cell according to the PDCCH monitoring adaptation indication, and not perform PDCCH monitoring in other serving cells according to the PDCCH monitoring adaptation indication.

In one example, the PDCCH monitoring adaptation indication is further configured to indicate the user equipment to determine to perform PDCCH monitoring in each of the serving cells in a cell group to which the first serving cell belongs according to the PDCCH monitoring adaptation indication.

In one example, the cell group is a cell group for switch configured by a network device, or a cell group determined based on a protocol.

In one example, the PDCCH monitoring adaptation indication is configured to indicate at least one of the following: PDCCH skipping; and SSSG switching.

In one example, the PDCCH monitoring adaptation indication is configured to indicate PDCCH skipping.

In one example, the PDCCH monitoring adaptation indication is configured to indicate SSSG switching.

In one example, the PDCCH monitoring adaptation indication is configured to indicate the PDCCH skipping and the SSSG switching.

In one example, active bandwidth portions (BWPs) of all serving cells in the cell group have the same PDCCH skipping configuration; or configured BWPs of all the serving cells in the cell group have the same PDCCH skipping configuration.

In one example, the active BWPs of all the serving cells in the cell group have the same SSSG configuration; or the configured BWPs of all the serving cells in the cell group have the same SSSG configuration.

In one example, the number of bits occupied by a PDCCH monitoring adaptation bit field corresponding to a monitoring configuration of the active BWP of each serving cell in the cell group is the same, where the monitoring configuration includes a PDCCH skipping configuration and a SSSG configuration.

In one example, the number of bits occupied by a PDCCH monitoring adaptation bit field corresponding to a monitoring configuration of the configured BWP of each serving cell in the cell group is the same, where the monitoring configuration includes the PDCCH skipping configuration and the SSSG configuration.

In one example, the PDCCH monitoring adaptation indication is further configured to indicate the user equipment to determine to perform, according to the PDCCH monitoring adaptation indication, PDCCH monitoring in at least one second serving cell in the cell group to which the first serving cell belongs, where the at least one second serving cell has the same monitoring configuration as the first serving cell, and the monitoring configuration includes the PDCCH skipping configuration and the SSSG configuration.

In one example, the PDCCH monitoring adaptation indication is further configured to indicate the user equipment to determine to not perform PDCCH monitoring in at least one third serving cell in the cell group to which the first serving cell belongs according to the PDCCH monitoring adaptation indication, where the at least one third serving cell has a different monitoring configuration from the first serving cell, and the monitoring configuration includes the PDCCH skipping configuration and the SSSG configuration.

In one example, the PDCCH monitoring adaptation indication is configured to indicate the user equipment to determine to perform, according to the PDCCH monitoring adaptation indication, PDCCH monitoring in at least one fourth serving cell in the cell group to which the first serving cell belongs, where the at least one fourth serving cell has the same number of bits as the first serving cell, where the number of bits is the number of bits occupied by the PDCCH monitoring adaptation bit field.

In one example, the PDCCH monitoring adaptation indication is configured to indicate the user equipment to determine to not perform PDCCH monitoring in at least one fifth serving cell in the cell group to which the first serving cell belongs according to the PDCCH monitoring adaptation indication, where the at least one fifth serving cell has a different number of bits from the first serving cell, where the number of bits is the number of bits occupied by the PDCCH monitoring adaptation bit field.

Figure 14:
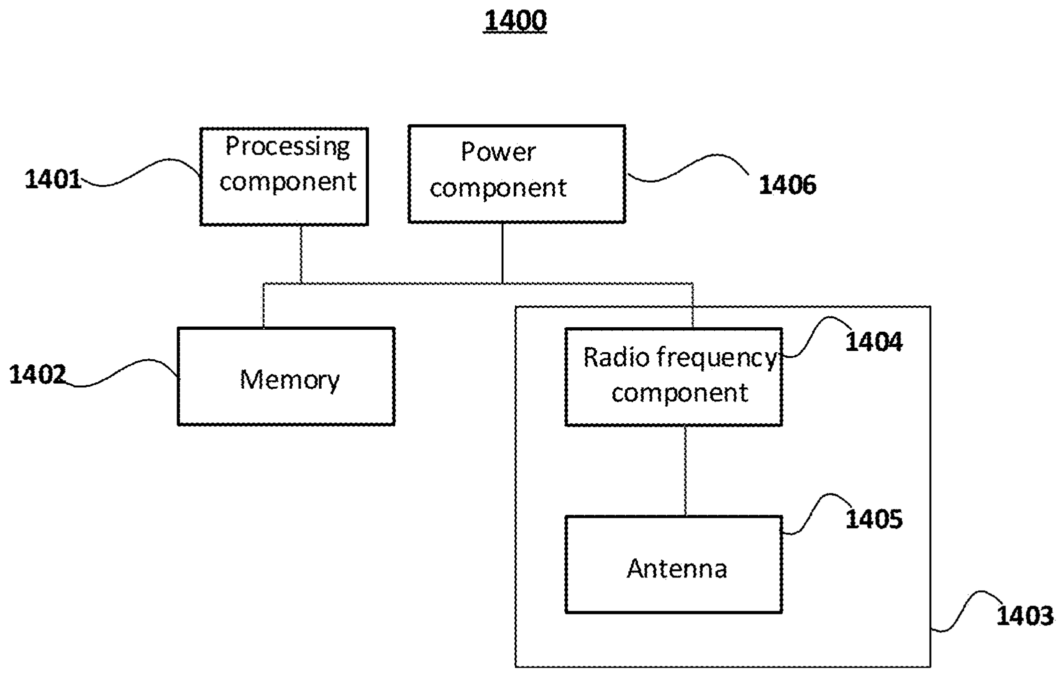
FIG. 14 is a structural diagram of a monitoring device illustrated according to an example.

In case the communication device is a network device, the structure of this communication device may also be shown in FIG. 14. The structure of the communication device is illustrated by taking the network device 101, being a base station, as an example. As shown in FIG. 14, the communication device 1400 includes a processing component 1401, a memory 1402, a transceiver component 1403, and a power component 1406. The memory 1402 is coupled with the processing component 1401, which may be configured to store programs and data for the communication device 1400 to implement various functions. The processing component 1401, e.g., a processor, is configured to support the communication device 1400 to perform the corresponding functions in the above methods. The functions may be achieved by invoking a program stored in the memory 1402. The transceiver component 1403 may be a wireless transceiver that may be configured to support the communication device 1400 to receive signaling and/or data and to send the signaling and/or data through a wireless air interface. The transceiver component 1403 may also be referred to as a transceiver unit or a communication unit. The transceiver component 1403 may include a radio frequency component 1404 and one or more antennas 1405, where the radio frequency component 1404 may be a remote radio unit (RRU), which may be specifically used for the transmission of a radio frequency signal and the conversion between a radio frequency signal and a baseband signal. The one or more antennas 1405 may be specifically configured for transmission and reception of radio frequency signals.

In case the communication device 1400 needs to send data, the processor 1401 may perform baseband processing on the to-be-sent data, and then output a baseband signal to the radio frequency unit. The radio frequency unit may perform radio frequency processing on the baseband signal, and then send the radio frequency signal in a form of electromagnetic waves through the antenna. In case that data is sent to the communication device 1400, the radio frequency unit receives a radio frequency signal through the antenna, converts the radio frequency signal into a baseband signal, and outputs the baseband signal to the processor 1401. The processor 1401 converts the baseband signal into data, and processes the data.

Those skilled in the art would readily conceive other implementations of the embodiments of the present disclosure upon consideration of the specification and practice of the present disclosure here. The present disclosure is intended to cover any variations, uses, or adaptations of the embodiments of the present disclosure. These variations, uses, or adaptations comply with the general principles of the embodiments of the present disclosure, and include common knowledge or customary technical means in the art, which are not disclosed herein. The specification and embodiments are to be considered as illustrative merely, the scope and spirit of the embodiments of the present disclosure are defined by the following claims.

It is to be understood that the embodiments of the present disclosure are not limited to the precise structure that has been described above and illustrated in the accompanying drawings, and that various modifications and changes can be made without departing from the scope thereof. The scope of the embodiments of the present disclosure is merely limited by the appended claims.

INDUSTRIAL APPLICABILITY

After receiving a PDCCH monitoring adaptation indication on a first serving cell, the user equipment, taking into consideration the cell group to which the first serving cell belongs, determines on which serving cells in the cell group the PDCCH monitoring adaptation indication may take effect. In this way, network resources can be appropriately scheduled to improve network performance.

The invention claimed is:

1. A method for monitoring a channel, performed by a user equipment, comprising:

receiving a physical downlink control channel (PDCCH) monitoring adaptation indication on a first serving cell; and determining that the user equipment performs PDCCH monitoring in the first serving cell according to the PDCCH monitoring adaptation indication;

wherein determining that the user equipment performs the PDCCH monitoring in the first serving cell according to the PDCCH monitoring adaptation indication comprises:

determining that the user equipment performs, according to the PDCCH monitoring adaptation indication, the PDCCH monitoring in each of serving cells in a cell group to which the first serving cell belongs;

wherein a number of bits occupied by a PDCCH monitoring adaptation bit field corresponding to a monitoring configuration of an active bandwidth portion (BWP) of each of the serving cells in the cell group is a same, and the monitoring configuration comprises a PDCCH skipping configuration and a search space set group (SSSG) configuration; or a number of bits occupied by a PDCCH monitoring adaptation bit field corresponding to a monitoring configuration of a configured BWP of each of the serving cells in the cell group is the same, and the monitoring configuration comprises the PDCCH skipping configuration and the SSSG configuration.

2. The method according to claim 1, wherein determining that the user equipment performs the PDCCH monitoring in the first serving cell according to the PDCCH monitoring adaptation indication comprises: determining that the user equipment only performs the PDCCH monitoring in the first serving cell according to the PDCCH monitoring adaptation indication, and does not perform the PDCCH monitoring in other serving cells according to the PDCCH monitoring adaptation indication.

3. The method according to claim 1, wherein the cell group is a cell group for switch configured by a network device; or the cell group is a cell group determined based on a protocol.

4. The method according to claim 1, wherein the PDCCH monitoring adaptation indication is configured to indicate at least one of PDCCH skipping or SSSG switching.

5. The method according to claim 4, wherein active BWPs of all the serving cells in the cell group have the same PDCCH skipping configuration; or configured BWPs of all the serving cells in the cell group have the same PDCCH skipping configuration;

wherein the active BWPs of all the serving cells in the cell group having the same PDCCH skipping configuration comprise:

the active BWPs of all the serving cells in the cell group are not configured with the PDCCH skipping configurations; or the active BWPs of all the serving cells in the cell group are configured with the PDCCH skipping configurations, and a number of PDCCH skipping durations in the PDCCH skipping configurations is the same; and wherein the configured BWPs of all the serving cells in the cell group having the same PDCCH skipping configuration comprise:

the configured BWPs of all the serving cells in the cell group are not configured with the PDCCH skipping configurations; or the configured BWPs of all the serving cells in the cell group are configured with the PDCCH skipping configurations, and the number of PDCCH skipping durations in the PDCCH skipping configurations is the same.

6. The method according to claim 4, wherein active BWPs of all the serving cells in the cell group have the same SSSG configuration; or configured BWPs of all the serving cells in the cell group have the same SSSG configuration;

wherein the active BWPs of all the serving cells in the cell group having the same SSSG configuration comprise:

the active BWPs of all the serving cells in the cell group are not configured with the SSSG configurations; or the active BWPs of all the serving cells in the cell group are configured with the SSSG configurations, and a number of SSSGs in the SSSG configurations is the same; and wherein the configured BWPs of all the serving cells in the cell group having the same SSSG configuration comprise:

the configured BWPs of all the serving cells in the cell group are not configured with the SSSG configurations; or the configured BWPs of all the serving cells in the cell group are configured with the SSSG configurations, and the number of SSSGs in the SSSG configurations is the same.

7. The method according to claim 1, comprising:

determining that the user equipment performs, according to the PDCCH monitoring adaptation indication, the PDCCH monitoring in at least one second serving cell in a cell group to which the first serving cell belongs, wherein the at least one second serving cell has the same monitoring configuration as the first serving cell, and the monitoring configuration comprises a PDCCH skipping configuration and the SSSG configuration; or determining that the user equipment performs, according to the PDCCH monitoring adaptation indication, the PDCCH monitoring in the at least one second serving cell in a cell group to which the first serving cell belongs, wherein the at least one second serving cell has the same monitoring configuration as the first serving cell; and determining that the user equipment does not perform the PDCCH monitoring in at least one third serving cell in the cell group to which the first serving cell belongs according to the PDCCH monitoring adaptation indication, wherein the at least one third serving cell has a different monitoring configuration from the first serving cell, and the monitoring configuration comprises a PDCCH skipping configuration and the SSSG configuration; or determining that the user equipment performs, according to the PDCCH monitoring adaptation indication, the PDCCH monitoring in at least one fourth serving cell in a cell group to which the first serving cell belongs, wherein the at least one fourth serving cell has the same number of bits as the first serving cell, and a number of bits is the number of bits occupied by a PDCCH monitoring adaptation bit field; or determining that the user equipment performs, according to the PDCCH monitoring adaptation indication, the PDCCH monitoring in the at least one fourth serving cell in a cell group to which the first serving cell belongs, wherein the at least one fourth serving cell has the same number of bits as the first serving cell; and determining that the user equipment does not perform the PDCCH monitoring in at least one fifth serving cell in the cell group to which the first serving cell belongs according to the PDCCH monitoring adaptation indication, wherein the at least one fifth serving cell has a different number of bits from the first serving cell, and the number of bits is the number of bits occupied by the PDCCH monitoring adaptation bit field.

8. A non-transitory computer-readable storage medium storing instructions thereon, wherein the instructions, when executed by a processor of a communication device, cause the communication device to execute perform the method for monitoring the channel according to claim 1.

9. A monitoring method, performed by a network device, comprising:

sending, on a first serving cell, a physical downlink control channel (PDCCH) monitoring adaptation indication to a user equipment, wherein the PDCCH monitoring adaptation indication is configured to indicate the user equipment to determine to perform PDCCH monitoring in the first serving cell according to the PDCCH monitoring adaptation indication;

wherein the PDCCH monitoring adaptation indication is further configured to indicate the user equipment to determine to perform, according to the PDCCH monitoring adaptation indication, the PDCCH monitoring in each of serving cells in a cell group to which the first serving cell belongs;

wherein a number of bits occupied by a PDCCH monitoring adaptation bit field corresponding to a monitoring configuration of an active bandwidth portion (BWP) of each of the serving cells in the cell group is a same, and the monitoring configuration comprises a PDCCH skipping configuration and a search space set group (SSSG) configuration; or a number of bits occupied by a PDCCH monitoring adaptation bit field corresponding to a monitoring configuration of a configured BWP of each of the serving cells in the cell group is the same, and the monitoring configuration comprises the PDCCH skipping configuration and the SSSG configuration.

10. The method according to claim 9, wherein the PDCCH monitoring adaptation indication is further configured to indicate the user equipment to determine to only perform the PDCCH monitoring in the first serving cell according to the PDCCH monitoring adaptation indication, and not perform the PDCCH monitoring in other serving cells according to the PDCCH monitoring adaptation indication.

11. The method according to claim 9, wherein the cell group is a cell group for switch configured by the network device; or the cell group is a cell group determined based on a protocol.

12. The method according to claim 9, wherein the PDCCH monitoring adaptation indication is configured to indicate at least one of PDCCH skipping or SSSG switching.

13. The method according to claim 12, wherein active BWPs of all the serving cells in the cell group have the same PDCCH skipping configuration; or configured BWPs of all the serving cells in the cell group have the same PDCCH skipping configuration; or the active BWPs of all the serving cells in the cell group have the same SSSG configuration; or the configured BWPs of all the serving cells in the cell group have the same SSSG configuration.

14. The method according to claim 9, wherein the PDCCH monitoring adaptation indication is further configured to indicate the user equipment to determine to perform, according to the PDCCH monitoring adaptation indication, the PDCCH monitoring in at least one second serving cell in a cell group to which the first serving cell belongs, wherein the at least one second serving cell has the same monitoring configuration as the first serving cell, and the monitoring configuration comprises a PDCCH skipping configuration and a SSSG configuration; or the PDCCH monitoring adaptation indication is further configured to: indicate the user equipment to determine to perform, according to the PDCCH monitoring adaptation indication, the PDCCH monitoring in the at least one second serving cell in a cell group to which the first serving cell belongs, wherein the at least one second serving cell has the same monitoring configuration as the first serving cell; and indicate the user equipment to determine to not perform the PDCCH monitoring in at least one third serving cell in the cell group to which the first serving cell belongs according to the PDCCH monitoring adaptation indication, wherein the at least one third serving cell has a different monitoring configuration from the first serving cell, and the monitoring configuration comprises a PDCCH skipping configuration and a SSSG configuration; or the PDCCH monitoring adaptation indication is configured to indicate the user equipment to determine to perform, according to the PDCCH monitoring adaptation indication, the PDCCH monitoring in at least one fourth serving cell in a cell group to which the first serving cell belongs, wherein the at least one fourth serving cell has the same number of bits as the first serving cell, and a number of bits is the number of bits occupied by a PDCCH monitoring adaptation bit field; or the PDCCH monitoring adaptation indication is configured to:

indicate the user equipment to determine to perform, according to the PDCCH monitoring adaptation indication, the PDCCH monitoring in the at least one fourth serving cell in a cell group to which the first serving cell belongs, wherein the at least one fourth serving cell has the same number of bits as the first serving cell; and indicate the user equipment to determine to not perform the PDCCH monitoring in at least one fifth serving cell in the cell group to which the first serving cell belongs according to the PDCCH monitoring adaptation indication, wherein the at least one fifth serving cell has a different number of bits from the first serving cell, and the number of bits is the number of bits occupied by the PDCCH monitoring adaptation bit field.

15. A communication device, comprising:

one or more processors; and a memory that stores a computer program; and wherein the computer program, when executed by the one or more processors, causes the communication device to perform the method according to claim 9.

16. A communication device, comprising:

one or more processors; and a memory that stores a computer program; and wherein the computer program, when executed by the one or more processors, causes the communication device to:

receive a physical downlink control channel (PDCCH) monitoring adaptation indication on a first serving cell; and determine that a user equipment performs PDCCH monitoring in the first serving cell according to the PDCCH monitoring adaptation indication;

wherein the computer program, when executed by the one or more processors, further causes the communication device to:

determine that the user equipment performs, according to the PDCCH monitoring adaptation indication, the PDCCH monitoring in each of serving cells in a cell group to which the first serving cell belongs;

wherein a number of bits occupied by a PDCCH monitoring adaptation bit field corresponding to a monitoring configuration of an active bandwidth portion (BWP) of each of the serving cells in the cell group is a same, and the monitoring configuration comprises a PDCCH skipping configuration and a search space set group (SSSG) configuration; or a number of bits occupied by a PDCCH monitoring adaptation bit field corresponding to a monitoring configuration of a configured BWP of each of the serving cells in the cell group is the same, and the monitoring configuration comprises the PDCCH skipping configuration and the SSSG configuration.

* * * * *